Inventors:
Edw. R. Lamoureux
Bernard N. Pierce
By Church & Church
Their Attorneys

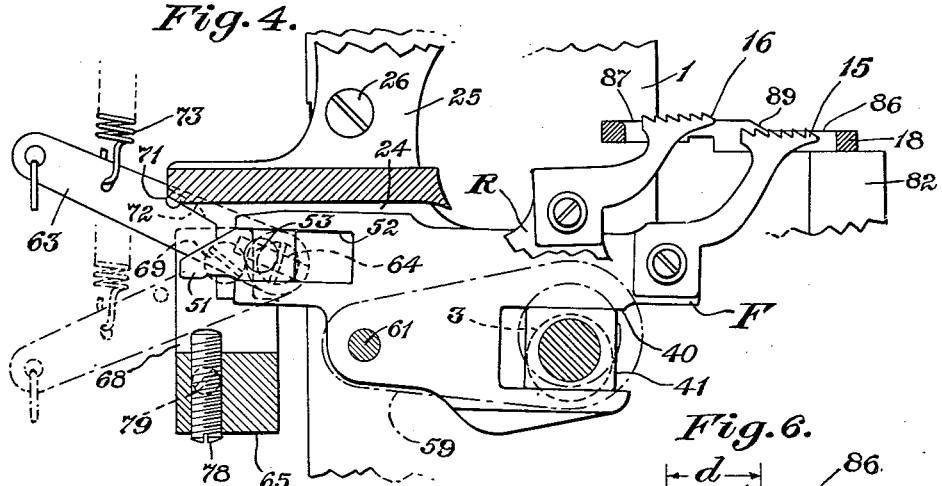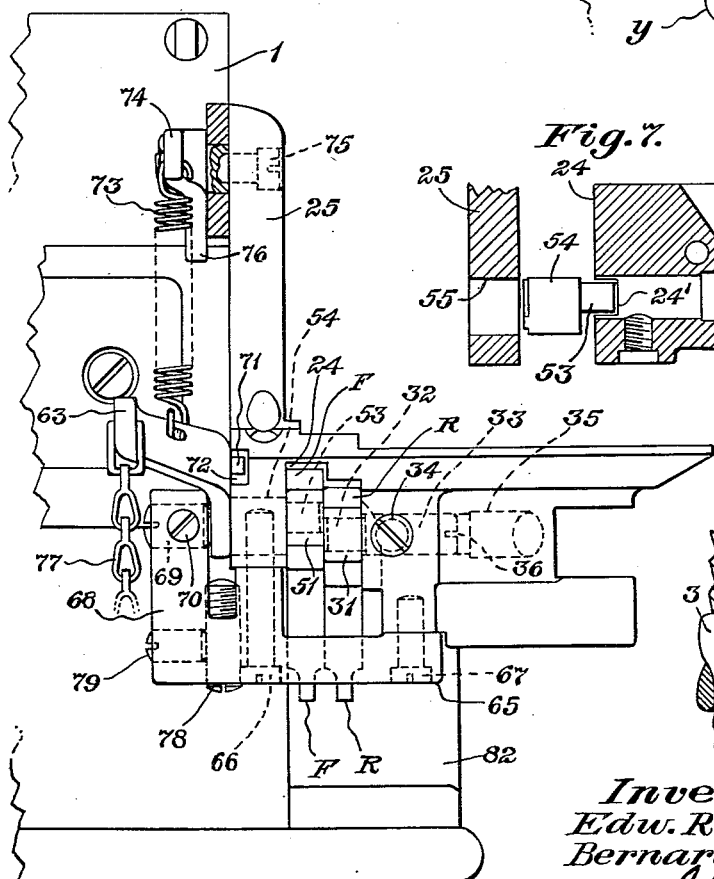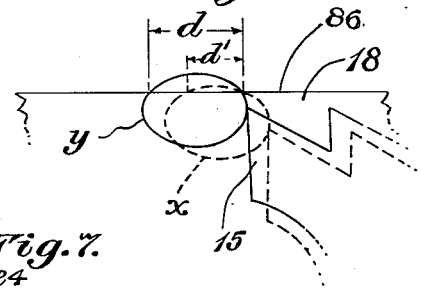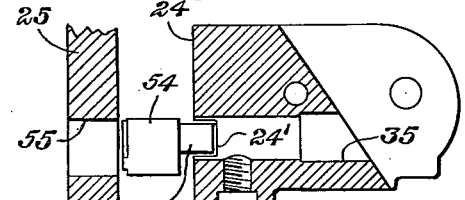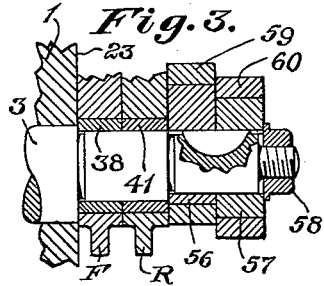

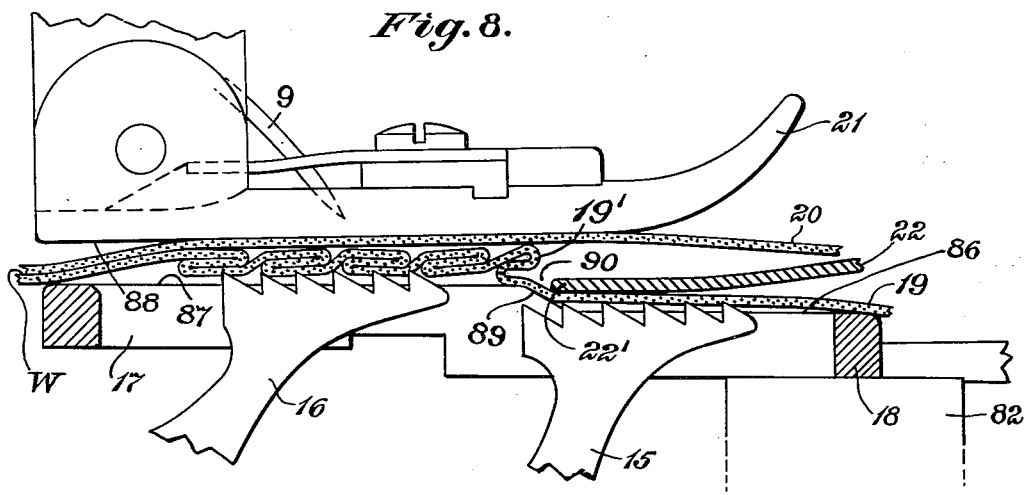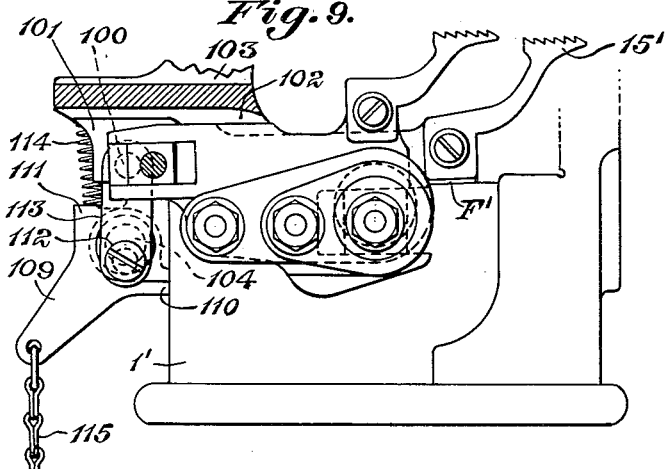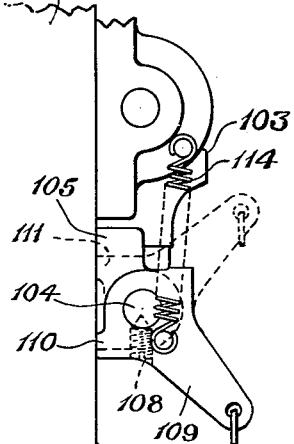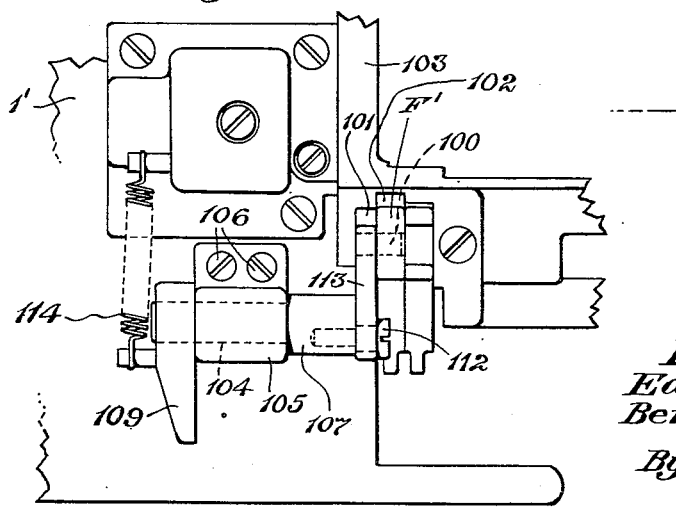

United States Patent Office 2,769,417
Patented Nov. 6, 1956

2,769,417

FEED CONTROL FOR SHIRRING MECHANISM

Edward R. Lamoureux, Bloomfield, and Bernard N. Pierce, West Hartford, Conn., assignors to The Merrow Machine Company, Hartford, Conn., a corporation of Connecticut Application July 29, 1952, Serial No. 301,426

15 Claims. (Cl. 112—209)

This invention relates to sewing machine shirring or gathering mechanism of the type wherein separate feed dogs are moved in work feeding strokes of respectively different lengths and particularly concerns control of the degree of differential effected by the feeding strokes of the respective feed dogs.

Variation in the effective length of the feeding stroke of the feed dog operable to feed work toward the needle as compared with the effective length of the feeding stroke of the feed dog operable to feed work from the needle causes material between the front and rear feed dogs to be fulled more or less according to the degree of differential effected by the strokes of the respective feed dogs. Such fulling of material may be applied to one or more plies comprising the work advanced toward stitching elements. This invention is especially useful for stitching together two work plies where only one of the plies is appreciably subjected to the fulling action.

Provision for the control of the amount or degree to which this fulling is effected permits an operator to select that amount of fulling which is required to secure accurate disposition of one ply of work upon another ply as the two plies are seamed together. This fulling may be distributed in minute amounts, and imperceptible as ordinarily observed, or applied in greater degree to produce ornamental shirring.

A major object of this invention is to provide an improved shirring or gathering mechanism with a control for varying the degree of differential feed effected by the dogs and which contains few parts, of simple form, arranged for convenience of assembly, and effective in operation of the machine to produce work of superior quality. Primarily, this invention concerns the provision of such a mechanism in the well-known "Merrow" type overedge sewing machine wherein the feeding mechanism is substantially like that disclosed in United States Letters Patent No. 1,071,818, granted September 2, 1913 upon application of William H. Stedman.

As disclosed in that patent, the feeding mechanism includes a pair of feed dogs independently actuated in four-motion feeding movements so that each feed dog moves in a separate orbital path. An important feature in the present invention resides in the provision of a shiftable pivot for the carrier of one of the feed dogs so the operator may change the position of the orbital path for that feed dog between a shirring position and a seaming position with respect to the orbital path of the other feed dog without interrupting operation of the machine. In this way, the relative lengths of the effective feeding stroke of the two feed dogs are varied and accordingly, the degree of differential feed imparted to the work is changed. Other features of the invention include adjustment of the pivotal support for the second feed dog as well as the arrangement of stops, including an adjustable stop for limiting movement of the manually-adjustable device for changing the position of the orbital path of the first feed dog.

Particular advantages to be derived from the invention will become apparent from the following detailed description and reference to the accompanying drawings while the novelty of the invention is defined in the appended claims.

In the drawings:

Fig. 3 is a fragmentary sectional view on line 3 of Fig. 1 showing elements of the feed mechanism;

Fig. 4 is a vertical sectional view taken substantially along line 4—4 of Fig. 2;

Fig. 5 is a partial rear view of the machine frame showing the head and feed mechanism in rear elevation;

Fig. 6 is an enlarged diagrammatic detail view showing two positions of an orbital path followed by a feed dog;

Fig. 7 is a detail view showing the pivot of one feed dog carrier in disassembled relation to the head;

Fig. 8 is an enlarged detail view showing effect of the feed dog action on work;

Fig. 9 is a view similar to Fig. 1 showing a modified form of front feed adjusting mechanism and with front feed dog in position to engage the work;

Fig. 10 is a partial rear view of the machine frame showing the head and the modified form of feed mechanism shown in Fig. 9; and Fig. 11 is a view of the feed adjusting mechanism shown in Fig. 9 as seen from the left in said figure.

Figure 1:
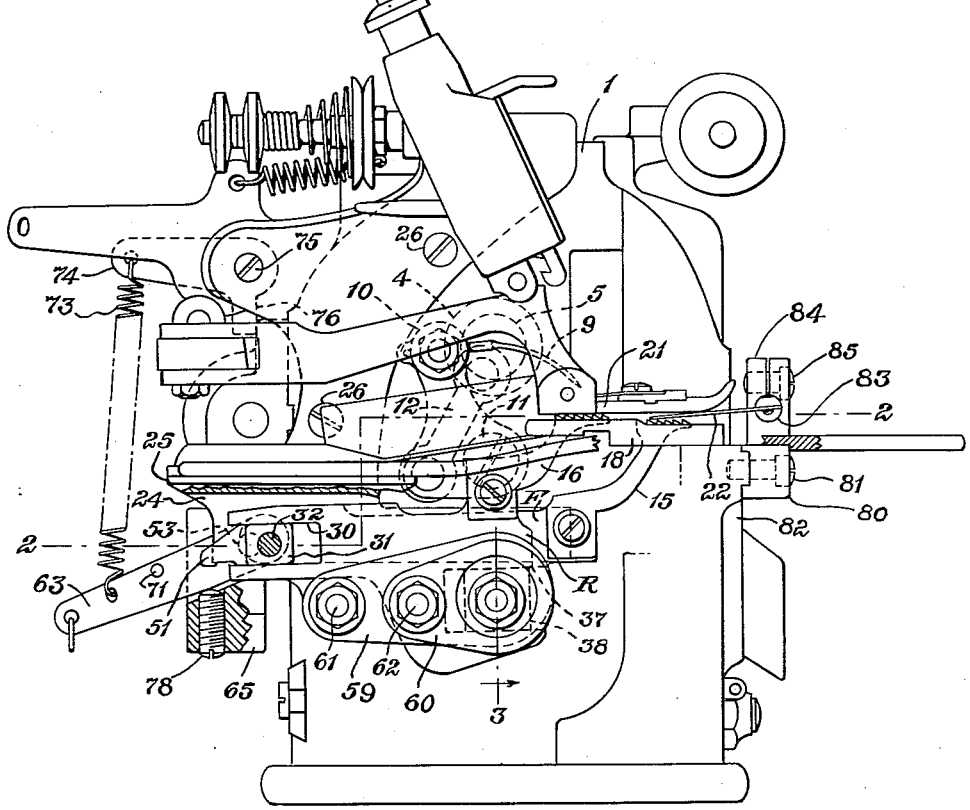
Fig. 1 is a left end view of a sewing machine of the Merrow type with certain parts omitted or in section to more clearly illustrate feed and associated mechanism comprising the present invention.

Referring to the drawings, certain of the illustrated parts and their purposes may be briefly described as follows. The machine frame 1 is provided at its left end with a bearing 2 for a lower or main shaft 3 and with a bearing 4 for an auxiliary or upper shaft 5. For rotating shafts 3 and 5 in unison, means (not shown) are housed within a mechanism compartment 6 formed within machine frame 1. One side of mechanism compartment 6 is provided with an access opening 7 normally closed by a suitably removable frame cap 8. A curved needle 9 is held in a carrier 10 pivoted on a stud 11 threaded into the end of the machine fraime. By means of a link 12 connecting needle carrier 10 with upper shaft 5 the needle is movable in an arcuate path to cooperate with loopers (not shown) in the formation of overedge stitches.

The feeding mechanism includes a front feed dog 15 and a rear feed dog 16 (see Fig. 8) which are movable upwardly through feed slots as 17 in a needle plate 18 to engage work W, which as shown may comprise a lower ply 19 and an upper ply 20. For feeding work W in rear of needle 9, rear feed dog 16 cooperates with the usual presserfoot 21. In the arrangement of work shown in Fig. 8 the function of the front feed dog is to advance the lower ply 19 of work W faster than the work as a whole is advanced by the rear feed dog 16, this action being effective to produce shirring of the under ply in accordance with practice heretofore common in this art. The front feed dog for the purpose indicated is arranged to cooperate with a resiliently yieldable separator blade 22 interposed between plies 19 and 20 of work W, and, of course, the length of the feeding stroke of this feed dog is greater than that of the rear feed dog 16.

In differential feed arrangements of this nature it is desirable that the front feed dog may at times be rendered substantially ineffective, as would be the case if both plies of fabric comprising the work were to be advanced in unison and for an equal distance by the rear feed dog while shirring of the lower ply by the front feed dog was omitted. As will presently more fully appear, the feed dogs 15 and 16 are moved in separate orbital paths by actuating mechanism driven by the lower or main shaft 3. This mechanism in the present invention includes shiftable pivotal support whereby the path of movement of the front feed dog 15 may be established in shirring position as indicated at y (Fig. 6) where it is effective to feed the work at each stroke a distance as indicated at d, or shifted to a seaming position indicated at x (Fig. 6) where it is effective to feed the work at each stroke only an amount sufficient to overcome drag tending to stretch the work material, or a distance as indicated at d'. As shown in Figs. 1 and 8, feed dog 15 is in shirring position to engage the work for moving it the distance d, while moving in its orbit as at y, (see Fig. 6).

Front and rear feed dogs 15 and 16 are secured to and carried by feed bars or carriers F and R, respectively. These feed dog carriers are located side by side and extend from front to rear of the machine, with carrier F contiguous to the end surface 23 of machine frame 1. Longitudinal alignment of both carriers is maintained by walls of a guide channel 24 formed in a head or bracket 25 which is secured to the end of machine frame 1 as by screws 26.

To permit feed carrier R to oscillate in the plane of and during its four-motion action, it is yoke-formed at its rear end as at 30 for slidable support on a rectangular block 31 pivotally sleeved upon slightly eccentric end 32 of a pin 33 extending from one side of the above-mentioned guide channel 24. Pivotal pin 33 is supported in head 25 and is locked in place by a set screw 34. Adjustment of the pivotal axis for block 31 may be effected by a screw driver introduced through bore 35 and engaged with slot 36 in the end of pin 33. To permit rising-and-falling movement to be imparted to carrier R as well as feed-and-return movement thereof, it is yoke-formed adjacent its front end as at 37 to slidably engage a feed-raising eccentric block 38 on main shaft 3. Carrier F for front feed dog 15 is slightly longer than feed dog carrier R but is actuated in substantially the same manner. Like carrier R, carrier F is yoke-formed adjacent its front end as at 40, to slidably engage a feed-raising eccentric block 41, and also yoke-formed adjacent its rear end as at 52 to slidably engage block 51. Block 51 is pivoted on pin 53 extending eccentrically from a short rock-shaft 54 supported by a bearing 55 in head 25. For imparting, through appropriate connections, feed-and-return movement to feed dogs 15 and 16, differential eccentrics 56 and 57, keyed to the main shaft 3 are held thereon by a nut 58, and are engaged respectively by links 59 and 60 (see Fig. 3). Link 59 is pivotally connected to carrier F by a stud 61 and similarly link 60 is pivotally connected to carrier R by a stud 62. By the described arrangement of eccentrics and link connections, feed carriers R and F are, upon rotation of shaft 3, independently actuated to move feed dogs 16 and 15 in suitable orbital paths, the movements imparted being characteristic of four-motion differential feeds common in the prior art. In the present invention the position of the orbital paths indicated is established respectively by pivot pins 33 and 53. In the arrangement explained above whereby the position of pivot pin 33 may be adjusted, provision is made for tilting carrier R to establish a suitable position for the orbital path of feed dog 16. Similarly, as shaft 54 is turned, the position of pin 53 is changed and the orbital path of movement of feed dog 15 is correspondingly shifted as illustrated at x and y in Fig. 6. It will be noted that the supporting pivot pins 33 and 53 which determine the positions respectively of orbital paths of feed dogs R and F are independent of and remote from the mechanism by which the feed dogs are made to move in their respective orbital paths. When shaft 54 is turned, it shifts the position of the axis of pivot pin 53 to change the position of the orbital path in which feed dog 15 is moved. This change is accomplished without effecting any change in the parameters of the orbit. To effect and control such change of the position of pin 53 in accordance with requirements as to change in position of feed carrier F and its path of movement, a lever 63 is keyed to rock-shaft 54 and secured by a screw 64.

As best illustrated in Figs. 4 and 5, a block or bracket 65 is secured to head 25 by screws as 66 and 67, so it strengthens the head 25 by bridging feed carrier housing channel 24. An upward extension or arm 68 of bracket 65 laterally opposes lever 63 adjacent its attachment to rock-shaft 54 and affords support for a thrust-receiving screw 69 which may be secured in desired adjustment by a set screw 70 to maintain alignment of the shaft and lever. With lever 63 in the position in which it is shown in full lines in Fig. 4, shaft 54 has been turned to elevate pin 53 to establish feed dog carrier F in position to lower feed dog 15 into seaming position with a path of movement as indicated by dotted line x in Fig. 6. In this position of lever 63, a stop 71 laterally extended therefrom engages a stop surface 72 on head 25, the lever being resiliently urged toward and normally held in this position by a spring 73. Respective ends of spring 73 are secured to an intermediate portion of lever 63 and to an arm 74. Thus, spring 73, blade 22, and the presser foot spring all act in the same direction to urge the feed dog 15 downwardly toward its seaming position. Arm 74 is supported on head 25 by a bolt 75, one end of the arm having an extension 76 adapted to engage a suitable part of the machine to thereby prevent axial displacement of the arm under pull of the spring at its distal end. The distal end of lever 63 is offset to provide suitable alignment and has attached thereto a pull chain 77 by which, through a treadle or other appropriate manually-operable means (not shown), the lever may be moved to the position in which it is shown in dotted lines, Fig. 4, to thereby establish feed dog carrier F in shirring position to raise feed dog 15 into shirring position in which it follows a path of movement as indicated by line y in Fig. 6. Inasmuch as it may be desirable to vary the lower limit of movement of lever 63, an adjustable stop is supported in bracket 65 and comprises a screw 78 which may be locked in desired position by set screw 79.

Figure 2:
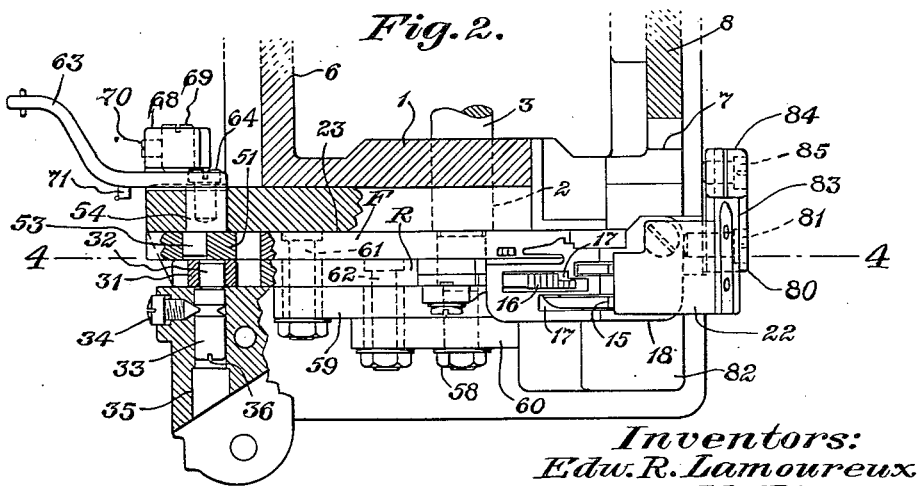
Fig. 2 is a horizontal sectional view of the machine frame taken on the line 2—2 of Fig. 1 showing also elements of feeding mechanism partly in section and the needle plate and associated parts in plan.

Brief reference has been made hereinbefore to the separator blade 22 (see Figs. 1, 2 and 8). Suitable means for supporting a blade of this character may comprise a supplemental bracket 80 secured as by a screw 81 to a support 82, which is, in the machine shown, the conventional element for supporting a needle plate such as 18. Blade 22 extends above needle plate 18 from a rod 83 sleeved at one end in a split bearing 84 of bracket 80. Blade 22 by virtue of being secured to rod 83 is permitted suitable angular adjustment with respect to the needle plate, and such adjustment of the blade as is selected may be secured by clamp screw 85. In its operative position, blade 22 extends between the forward portion of the needle plate 18 and presserfoot 21 for co-operation with front feed dog 15 to feed lower fabric ply 19. This portion of the needle plate presents a work supporting surface 86 that is slightly below the plane of a needle plate surface 87, the latter being opposed to the flat sole portion 88 of presserfoot 21. Intermediate the surfaces 86 and 87, is an inclined surface 89 of comparatively short extent. With blade 22 in the operative position in which it is shown in Fig. 8 (that is in substantially flatwise relation to surface 86) the free edge 22' of the blade is in proximity to inclined surface 89 thereby forming an upwardly directed throat 90 for passage of a fabric ply 19 as it is advanced by feed dog 15. Inasmuch as during this action the upper ply 20 is more slowly advanced by feed dog 16, ply 19, as it emerges from throat 90 is formed into a loop or fold of material as at 19'. Repetition of the cycle of action indicated produces shirring, ruffling or gathering of the material as shown in uniform evenly spaced folds.

Attention is here directed to Fig. 7 which shows a horizontal section of the head 25 through channel 24 at the level of the axis of rock-shaft 54. Shaft 54 is here shown in channel 24 opposite the bearing 55 therefor, to which position it must be moved prior to effecting its assembled relation to associated parts, inasmuch as the eccentricity of pin 53 places one side thereof beyond the periphery of shaft 54 (see Fig. 2). To permit movement of the shaft to this preassembled position, a groove 24' is formed in one side of channel 24 to accommodate pin 53 as the shaft is moved into alignment with its bearing 55.

A modified form of part of the mechanism included in this invention is directed like the similar mechanism already described to the raising and lowering of a movable bar comprising the carrier for a front feed dog. In this modified form of invention, shown in Figs. 9 to 11 inclusive, a pivotal pin 100 extends from feed dog carrier F' into a clearance groove forming a part 101 of channel 102 of head 103. Means for raising and lowering the position of this pivotal pin to effect desired location of its carrier F', include a rock-shaft 104 supported at the rear of machine frame 1' by a bracket 105 secured to the frame as by screws 106. At one end rock-shaft 104 is provided with an enlarged portion or head 107, and there is secured to the opposite end of the shaft, by a set screw as 108, a lever 109 whereby the rock-shaft may be turned about ninety degrees or until either one of two stop shoulders, as 110 and 111, engage frame 1'. For connecting rock-shaft 104 operatively with carrier F', a stud screw 112 extends from shaft head 107 eccentrically to the rotational axis of the shaft and a link 113 is engaged at its respective ends with stud screw 112 and the pin 100 extended from carrier F'. Thus through the described connections, lever 109 when moved to the position in which it is shown in Fig. 9 (that is with shoulder 110 against the machine frame) the forward end of carrier F' is elevated and its orbital path of movement is shifted to put feed dog 15' in feeding relation to the work, while with lever 109 moved to the position in which it is shown in dotted lines in Fig. 11 (that is with shoulder 111 against the machine frame) the forward end of carrier F' is lowered to practically remove feed dog 15' from feeding relation to the work.

Normally lever 109 is held in the position in which it is shown in dotted lines in Fig. 11 by a spring 114. Against the tension of this spring, lever 109 may be moved to its other extreme position by a pull chain 115 connected to a treadle, knee-shift or the like (not shown).

As changes in construction and different embodiments could be made without departing from the invention, it is intended that the foregoing description and the accompanying drawings be interpreted as illustrative and not in a limiting sense.

Having thus described our invention, what we claim as new and desire to secure by Letters Patent of the United States is:

1. In a sewing machine, a feeding mechanism comprising front and rear feed dogs, a carrier for each feed dog, each carrier being formed at one end with a yoke, blocks with which the yokes of respective carriers are slidably engaged, separate pivotal supports for said blocks, means for shifting one of said pivotal supports to change the position of its axis with respect to the axis of the other of said pivotal supports, means for independently moving said carriers to impart four-motion feeding movements to said feed dogs, the respective positions of the paths of movement of said feed dogs being determined by the relative positions of said axes, and adjustable stop means limiting the shifting movement of said one pivotal support to determine the relative positions of said orbital paths.

2. In a sewing machine, a feeding mechanism comprising front and rear feed dogs, a carrier for each feed dog, means for independently imparting four-motion feeding movement to each carrier to move the respective feed dogs, a link, a pivotal connection between one end of said link and the rear end of one of said carriers to determine the path of movement of said one carrier, a rock-shaft, a pin eccentrically extending from said rock-shaft and pivotally connected to the other end of said link, and a lever for actuating said rock-shaft to shift the position of said pin and change the position of said path of movement.

3. In a sewing machine having a main frame, a feeding mechanism comprising a supporting head formed with a guide channel, a rock-shaft supported in said head at one side of said channel, a pin eccentric on the end of said shaft extending into said channel, a block pivotally supported on said pin in said channel, a feed carrier slidable in said channel formed with a yoke at its end for sliding on said block, a feed dog on said carrier, a lever on said shaft for shifting said shaft to change the position of said pin, a bar secured to said head and bridging said channel, an arm extending from said bar and opposed to the outer side of said lever, an adjustable thrust-receiving element supported in said arm for maintaining alignment of said lever, and means for imparting four-motion feed movement to said carrier.

4. In a sewing machine having a main frame, a feeding mechanism comprising a supporting head secured to said main frame and formed with a guide channel, a rock-shaft in said head at one side of said channel, a pin eccentrically arranged on the end of said shaft and extending into said channel, a block pivotally mounted on said pin within said channel, a feed carrier in said channel and formed with a yoke slidably engaging said block, a feed dog on said carrier, a lever for shifting said shaft to shift the position of said pin, an adjustable stop for engaging said lever to limit the shifting movement thereof, and means for imparting four-motion feed movement to said carrier.

5. In a sewing machine having a main frame, a feeding mechanism comprising a head secured to said main frame and formed with a channel, a pair of rock-shafts supported in said frame at opposite sides of said channel, pins eccentric on the ends of said shafts extending into said channel, blocks pivotally mounted on each of said pins, front and rear feed carriers having yokes respectively slidable on said blocks in said channel, front and rear feed dogs on said carriers, means for securing in selected position the rock-shaft supporting the pin for said rear feed carrier, a lever on the other rock-shaft for turning said shaft to shift the pin supporting said front feed carrier, spring means normally urging said lever in one direction, an adjustable stop for limiting movement of said lever in the opposite direction, and means for independently imparting four-motion feed movement to each of said carriers.

6. In a sewing machine having a main frame, a feeding mechanism comprising a supporting head formed with a guide channel, a feed carrier slidable in said channel, a feed dog on said carrier, a pivot pin extending from said carrier, a rock-shaft in said head, a link connection between said pivot pin and said rock-shaft for positioning said pin, a lever on said shaft for shifting said shaft to change the position of said pin, and means for imparting four-motion feeding movement to said carrier.

7. In a sewing machine having a main frame, a feeding mechanism comprising a supporting head formed with a guide channel, a rock-shaft supported adjacent said head, a link coupled to said shaft and extending into said channel, a feed carrier slidable in said channel, a feed dog on said carrier, a pin pivotally connecting said link with said carrier, a lever for shifting said rock-shaft to change the position of said pin, spring means normally urging said lever in one direction, an adjustable stop for limiting movement of said lever in the opposite direction, and means for independently imparting four-motion movement to said carrier.

8. In a sewing machine, a feeding mechanism comprising a pair of feed dogs, separate pivotal supports for the respective feed dogs, a shaft, means independent of said supports operated by said shaft for independently moving said feed dogs in orbital paths having positions determined by the axes of said pivotal supports, manually operable means for shifting one of said pivotal supports relative to the other support to change the relative positions of the orbital paths of movement of said feed dogs, and adjustable stop means limiting the shifting movement of said one pivotal support to determine the relative positions of said orbital paths.

9. In a sewing machine, a feeding mechanism comprising a pair of feed dogs, separate pivotal supports for the respective feed dogs, a shaft, means independent of said supports operated by said shaft for independently moving said feed dogs in orbital paths having positions determined by the axes of said pivotal supports, manually operable means for shifting one of said pivotal supports relative to the other support to change the relative positions of the orbital paths of movement of said feed dogs, and a pair of stops limiting the shifting movement of said one pivotal support to determine the limits of the relative positions of said orbital paths, at least one of said stops being adjustable to vary one of the limits of movement of said one pivotal support.

10. In a sewing machine, a feeding mechanism comprising a pair of feed dogs, separate pivotal supports for the respective feed dogs, a shaft, means independent of said supports operated by said shaft for independently moving said feed dogs in orbital paths having positions determined by the axes of said pivotal supports, a link carrying at one of its ends one of said pivotal supports, and manually operable means effective on the other end of said link for shifting said link and said one pivotal support to change the relative positions of the orbital paths of movement of said feed dogs.

11. In a sewing machine, a feeding mechanism comprising a pair of feed dogs, separate pivotal supports for the respective feed dogs, a shaft, means independent of said supports operated by said shaft for independently moving said feed dogs in orbital paths, manually operable means for shifting one of said supports to shift one of said feed logs between a seaming position in which said feed dog has an effective feeding stroke similar to the effective feeding stroke of the other feed dog and a shirring position in which said one feed dog has an effective feeding stroke longer than the effective feeding stroke of the other feed dog.

12. In a sewing machine, a feeding mechanism comprising a pair of feed dogs, separate pivotal supports for the respective feed dogs, a shaft, means independent of said supports operated by said shaft for independently moving said feed dogs in orbital paths, manually operable means for shifting one of said pivotal supports relative to the other support to change the relative positions of the orbital paths of movements of said feed dogs, a first stop limiting shifting movement of said one support with one of said feed dogs in a seaming position in which it has an effective feeding stroke similar to the effective feeding stroke of the other feed dog, and a second stop limiting movement of said one support in the opposite direction with said one feed dog in a shirring position in which it has an effective feeding stroke longer than the effective feeding stroke of the other feed dog.

13. In a sewing machine, a feeding mechanism as defined in claim 12 wherein one of said stops is adjustable to vary the location of the shirring position of the feed dog.

14. In a sewing machine, a feeding mechanism comprising a pair of feed dogs, separate pivotal supports for the respective feed dogs, a shaft, means independent of said supports operated by said shaft for independently moving said feed dogs in orbital paths having positions determined by the axes of said pivotal supports, means for shifting one of said pivotal supports relative to the other support to change the relative positions of the orbital paths of movements of said feed dogs, spring means normally urging said shifting means to shift said one feed dog toward a seaming position in which it has an effective feeding stroke similar to the effective feeding stroke of the other feed dog, and manually operable means for moving said shifting means against the action of said spring to shift said one feed dog to a shirring position in which said one feed dog has an effective feeding stroke longer than the effective feeding stroke of the other feed dog.

15. In a sewing machine, a feeding mechanism comprising a pair of feed dogs, separate pivotal supports for the respective feed dogs, a shaft, means independent of said supports operated by said shaft for independently moving said feed dogs in orbital paths having positions determined by the axes of said pivotal supports, means for shifting one of said pivotal supports relative to the other support to change the relative positions of the orbital paths of movement of said feed dogs, spring means normally urging said shifting means to shift said one feed dog toward a seaming position, a stop limiting movement of said shifting means to position said one feed dog in said seaming position in which said one feed dog has an effective feeding stroke similar to the effective feeding stroke of the other feed dog, manually operable means for moving said shifting means to shift said one feed dog toward a shirring position, and an adjustable stop for limiting movement of said shifting means to position said one feed dog in a shirring position in which said one feed dog has an effectve feeding stroke longer than the effective feeding stroke of the other feed dog, the differential between the effective feeding strokes of the two feed dogs being variable by adjustment of said adjustable stop.

References Cited in the file of this patent

UNITED STATES PATENTS

| 1,071,818 | Stedman | Sept. 2, 1913 |
| 1,136,749 | Wright | Apr. 20, 1915 |
| 1,313,524 | DeVoe | Aug. 19, 1919 |
| 1,501,968 | Onderdonk | July 22, 1924 |
| 1,565,665 | Merrow | Dec. 15, 1925 |
| 1,879,106 | Corrall et al. | Sept. 27, 1932 |
| 2,052,408 | Knaus | Aug. 25, 1936 |
| 2,546,939 | Breul | Mar. 27, 1951 |
| 2,659,330 | Knaus | Nov. 17, 1953 |